US012794185B2

(12) United States Patent
Kurita

(10) Patent No.: US 12,794,185 B2
(45) Date of Patent: Nov. 10, 2026

(54) CONNECTOR FIXING STRUCTURE AND ELECTRICAL CONNECTION BOX

(71) Applicant: Sumitomo Wiring Systems, Ltd., Yokkaichi (JP)

(72) Inventor: Masanao Kurita, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 527 days.

(21) Appl. No.: 18/263,850

(22) PCT Filed: Jan. 26, 2022

(86) PCT No.: PCT/JP2022/002825
§ 371 (c)(1),
(2) Date: Aug. 1, 2023

(87) PCT Pub. No.: WO2022/168693
PCT Pub. Date: Aug. 11, 2022

(65) Prior Publication Data

US 2024/0120691 A1 Apr. 11, 2024

(30) Foreign Application Priority Data

Feb. 2, 2021 (JP) ................................. 2021-014713

(51) Int. Cl.
*H01R 13/73* (2006.01)
*H01R 13/502* (2006.01)
*H02G 3/16* (2006.01)

(52) U.S. Cl.
CPC ........... *H01R 13/73* (2013.01); *H01R 13/502* (2013.01); *H02G 3/16* (2013.01); *H01R 2201/26* (2013.01)

(58) Field of Classification Search
CPC .. H01R 13/508; H01R 31/085; H01R 12/771; H01R 13/502; H01R 13/40; H01R 12/59; H01R 43/027
See application file for complete search history.

(56) References Cited

U.S. PATENT DOCUMENTS

2012/0231645 A1* 9/2012 Byrne .................... H01R 4/646 439/215
2019/0075678 A1* 3/2019 Aragones Carrete ........................ H02S 40/345

FOREIGN PATENT DOCUMENTS

JP H4-135180 U 12/1992
JP H5-002527 1/1993
(Continued)

OTHER PUBLICATIONS

International Search Report, Application No. PCT/JP2022/002825, mailed Mar. 8, 2022. ISA/Japan Patent Office.

*Primary Examiner* — Phuong K Dinh
(74) *Attorney, Agent, or Firm* — Brooks Kushman P.C.

(57) ABSTRACT

A connector fixing structure includes: a connector having a main body portion and a lock portion provided on an outer face of the main body portion; and a holder having, on its surface, a locked portion that fits with the lock portion. The main body portion includes a first portion provided with the lock portion, and a second portion provided extending frontward in a fitting direction from the first portion. The holder is provided protruding from the surface in a predetermined direction intersecting the fitting direction and has a first contact portion opposing the second portion in the predetermined direction. The first contact portion comes into contact with the second portion when the second portion tilts from a reference orientation with a component in a direction approaching the surface, with the lock portion serving as a fulcrum.

12 Claims, 13 Drawing Sheets

(56) References Cited

FOREIGN PATENT DOCUMENTS

| | | | | | |
|---|---|---|---|---|---|
| JP | H5-050685 | | | 7/1993 | |
| JP | 2002-334753 | A | | 11/2002 | |
| JP | 2005039888 | A | * | 2/2005 | ......... B60R 16/0238 |
| JP | 2013-131413 | A | | 7/2013 | |
| JP | 2018-026281 | A | | 2/2018 | |

* cited by examiner

PRIOR ART

PRIOR ART

CONNECTOR FIXING STRUCTURE AND ELECTRICAL CONNECTION BOX

CROSS-REFERENCE TO RELATED APPLICATIONS

This application is the U.S. national stage of PCT/JP2022/002825 filed on Jan. 26, 2022, which claims priority of Japanese Patent Application No. JP 2021-014713 filed on Feb. 2, 2021, the contents of which are incorporated herein.

TECHNICAL FIELD

The present disclosure relates to a connector fixing structure and an electrical connection box.

BACKGROUND

JP 2018-026281A discloses a connector fixing structure that is used to fix a connector provided at an end of a wire harness to a support. A connector fixing structure is provided, for example, in an electrical connection box (also called a "junction box") of an automobile.

FIG. 12 is a diagram for illustrating the connector fixing structure of JP 2018-026281A. FIG. 12(*a*) is a schematic cross-sectional view of a connector 91. FIG. 12(*b*) shows how the connector 91 is fitted in the holder 92 in the same cross-section. In JP 2018-026281A, a connector 91 having a substantially rectangular tube shape is used. The left-right direction in FIG. 12(*a*) is the fitting direction of the connector 91 into the holder 92, the left side being the front side in the fitting direction, and the right side being the rear side in the fitting direction.

The connector 91 has a main body portion 911 and a lock portion 912. The lock portion 912 is formed integrally with a first face 913 of the main body portion 911. A connection hole 914 that is open rearward in the fitting direction is formed in the main body portion 911, and a male connector (not shown) is inserted into the connection hole 914. The lock portion 912 is provided on the front side in the fitting direction relative to the connection hole 914.

As shown in FIG. 12(*b*), a locked portion 921 that can fit with the lock portion 912, and a reinforcing protrusion 93 are formed in the holder 92. The locked portion 921 and the reinforcing protrusion 93 protrude from a surface 922 of the holder 92.

The connector 91 is fixed to the holder 92 by inserting the lock portion 912 of the connector 91 into the locked portion 921 of the holder 92 from the rear side to the front side in the fitting direction. At this time, a leading end portion 915 on the front side in the fitting direction of the connector 91 comes into contact with and is supported by a support face 931 of the reinforcing protrusion 93. The support face 931 supports an external force applied to the connector 91 via, for example, a wire harness (not shown). This makes it possible to reduce the risk that the locked portion 921 will be damaged due to the external force.

FIG. 13 is a diagram illustrating the problem to be solved of the present disclosure. Here, if the connector fixing structure is provided in an automobile, vibration continuously acts on the connector fixing structure due to the traveling of the automobile, the driving of the engine, and the like. If the connector tilts due to such vibration, the lock portion of the connector or the locked portion of the holder may be damaged. For this reason, a technique for suppressing tilting of the connector is required.

As a connector, in addition to the connector 91 shown in FIG. 12(*a*), for example, a connector 94 as shown in FIG. 13(*a*) is used in some cases. In addition, the technique of JP 2018-026281A cannot suitably suppress tilting of the connector 94.]

The connector 94 has a main body portion 941 and a lock portion 942 that fits with the locked portion 921 of the holder 92. The main body portion 941 includes a first portion 943 provided with the lock portion 942, and a second portion 944 that is integrally formed on the front side in the fitting direction of the first portion 943 and has a width in a predetermined direction smaller than that of the first portion 943. A connection hole 945 into which a male connector is to be inserted is formed in the first portion 943 so as to be open rearward in the fitting direction.

As shown in FIG. 13(*b*), the connector 94 is fixed to the holder 92 by inserting the lock portion 942 of the connector 94 into the locked portion 921 of the holder 92 from the rear side to the front side in the fitting direction. At this time, the leading end portion 946 on the front side in the fitting direction of the connector 94 comes into contact with and is supported by the support face 931 of the reinforcing protrusion 93.

Here, a gap d1*a* is formed between the second portion 944 of the connector 94 and the surface 922 of the holder 92, and the position of the lock portion 942 is spaced farther apart in the fitting direction from the support face 931 than the lock portion 912 of the connector 91. For this reason, when an external force such as vehicle vibration is applied to the connector 94, the connector 94 tilts in a direction including the fitting direction and the predetermined direction as indicated by the arrow AR1 while the leading end portion 946 slides in the predetermined direction on the support face 931. Then, there is a risk that the locked portion 921 will be more likely to break due to an external force being continuously applied to the locked portion 921 due to the tilting of the connector 94. Even if the support face 931 comes into contact with and supports the leading end portion 946 of the connector 94 in this manner, there are cases where the tilting of the connector 94 cannot be suitably reduced depending on the shape of the connector 94.

In view of this problem, an object of the present disclosure is to provide a connector fixing structure that can more suitably suppress tilting of the connector.

SUMMARY

The connector fixing structure of the present disclosure is a connector fixing structure including: a connector having a main body portion and a lock portion provided on an outer face of the main body portion; and a holder having, on its surface, a locked portion that fits with the lock portion, in which the main body portion includes a first portion provided with the lock portion, and a second portion provided extending frontward in a fitting direction from the first portion, the holder has a first contact portion that is provided protruding from the surface in a predetermined direction intersecting the fitting direction and opposes the second portion in the predetermined direction, and the first contact portion comes into contact with the second portion when the second portion tilts from a reference orientation with a component in a direction approaching the surface, with the lock portion serving as a fulcrum.

Advantageous Effects of the Disclosure

According to the present disclosure, it is possible to suppress tilting of the connector more suitably.

DETAILED DESCRIPTION OF PREFERRED EMBODIMENTS

Figure 1:
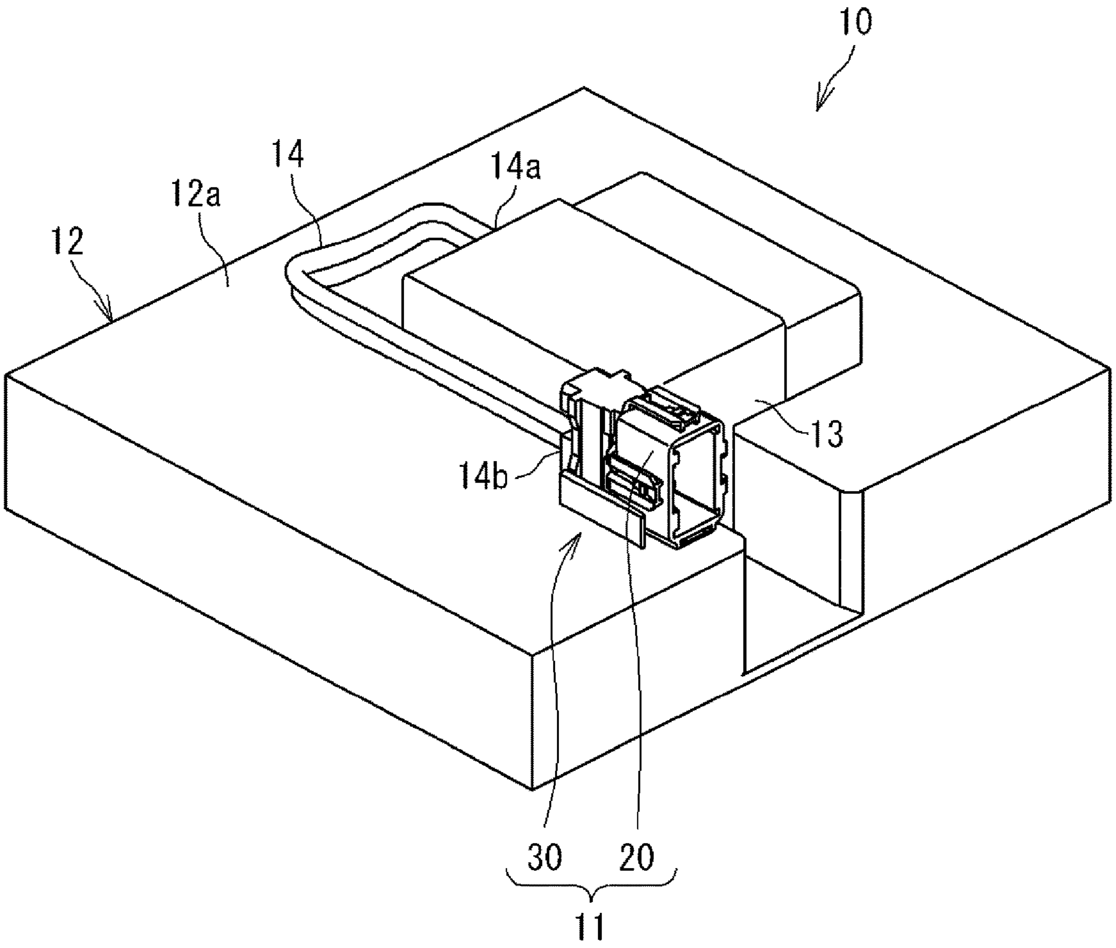
FIG. 1 is a perspective view showing a schematic configuration of an electrical connection box according to an embodiment.

The gist of the embodiment of the present disclosure includes at least the following.

The connector fixing structure of the present disclosure is a connector fixing structure including: a connector having a main body portion and a lock portion provided on an outer face of the main body portion; and a holder having, on its surface, a locked portion that fits with the lock portion, in which the main body portion includes a first portion provided with the lock portion, and a second portion provided extending frontward in a fitting direction from the first portion, the holder has a first contact portion that is provided protruding from the surface in a predetermined direction intersecting the fitting direction and opposes the second portion in the predetermined direction, and the first contact portion comes into contact with the second portion when the second portion tilts from a reference orientation with a component in a direction approaching the surface, with the lock portion serving as a fulcrum.

According to the connector fixing structure of the present disclosure, tilting of the connector can be suppressed by bringing the connector tilting from the reference orientation into contact with the first contact portion. In particular, the first contact portion faces the second portion of the connector in a predetermined direction and comes into contact with the tilting connector in the predetermined direction, and therefore tilting of the connector can be suppressed more suitably than in the conventional example.

Preferably, the first contact portion is not in contact with the second portion in the reference orientation. As a result, it is possible to suppress tilting of the connector and to prevent the lock portion and the locked portion from being subjected to excessive force when the connector does not tilt.

Preferably the first contact portion has an inclined face that is inclined such that a height from the surface increases toward a front side in the fitting direction. If the connector tilts in the predetermined direction during fitting, the inclined face comes into contact with the connector, whereby the connector can be guided in the fitting direction while reducing tilting of the connector in the predetermined direction. As a result, it is possible to prevent the connector from getting stuck during fitting.

Preferably, the holder further has a pair of second contact portions provided protruding in the predetermined direction from the surface, and the pair of second contact portions oppose both side faces of the connector in a width direction intersecting both the fitting direction and the predetermined direction, and come into contact with the connector tilting in the width direction with the lock portion serving as a fulcrum. By bringing the connector that tilts in the width direction into contact with the second contact portions, tilting of the connector can be suppressed.

The electrical connection box of the present disclosure is an electrical connection box that includes a case including the connector fixing structure according to any one of embodiments described above, a relay attached to the case, and a thermistor with a first end connected to the relay and a second end connected to the housing.

Hereinafter, details of embodiments of the present disclosure will be described with reference to the drawings.

Overall Configuration of Electrical Connection Box

FIG. 1 is a perspective view showing a schematic configuration of an electrical connection box 10 according to an embodiment. The electrical connection box 10 is a member connected between the battery of the automobile and a plurality of in-vehicle devices, and is also called a junction box (JB). The electrical connection box 10 includes a case 12 having a connector fixing structure 11 in a portion thereof, a relay 13 attached to the case 12, and a wire harness 14.

The connector fixing structure 11 includes a connector 20 and a holder 30 for fixing the connector 20. In this embodiment, the holder 30 is formed on an outer wall 12*a* of the case 12. For this reason, the connector 20 of the present embodiment is a so-called case-external connector that is fixed to the outer wall 12*a* of the case 12. Note that in the present embodiment, an example will be described in which the connector fixing structure 11 is provided in the case 12 of the electrical connection box 10, but the connector fixing structure 11 may also be provided in another configuration (e.g., a battery, a vehicle-mounted device).

The relay 13 is a component that is electrically connected between the battery and the vehicle-mounted device and controls on/off switching of an electric signal from the battery to the vehicle-mounted device. The wire harness 14 is wiring for detecting the temperature of the relay 13. A thermistor (not shown) is attached to one first end 14*a* of the wire harness 14, and the thermistor is thermally connected to the relay 13. Another second end 14*b* of the wire harness 14 is electrically connected to the connector 20. In this embodiment, the connector 20 is a component for electrically connecting wiring (not shown) and the wire harness 14.

Configuration of Connector

Figure 3:
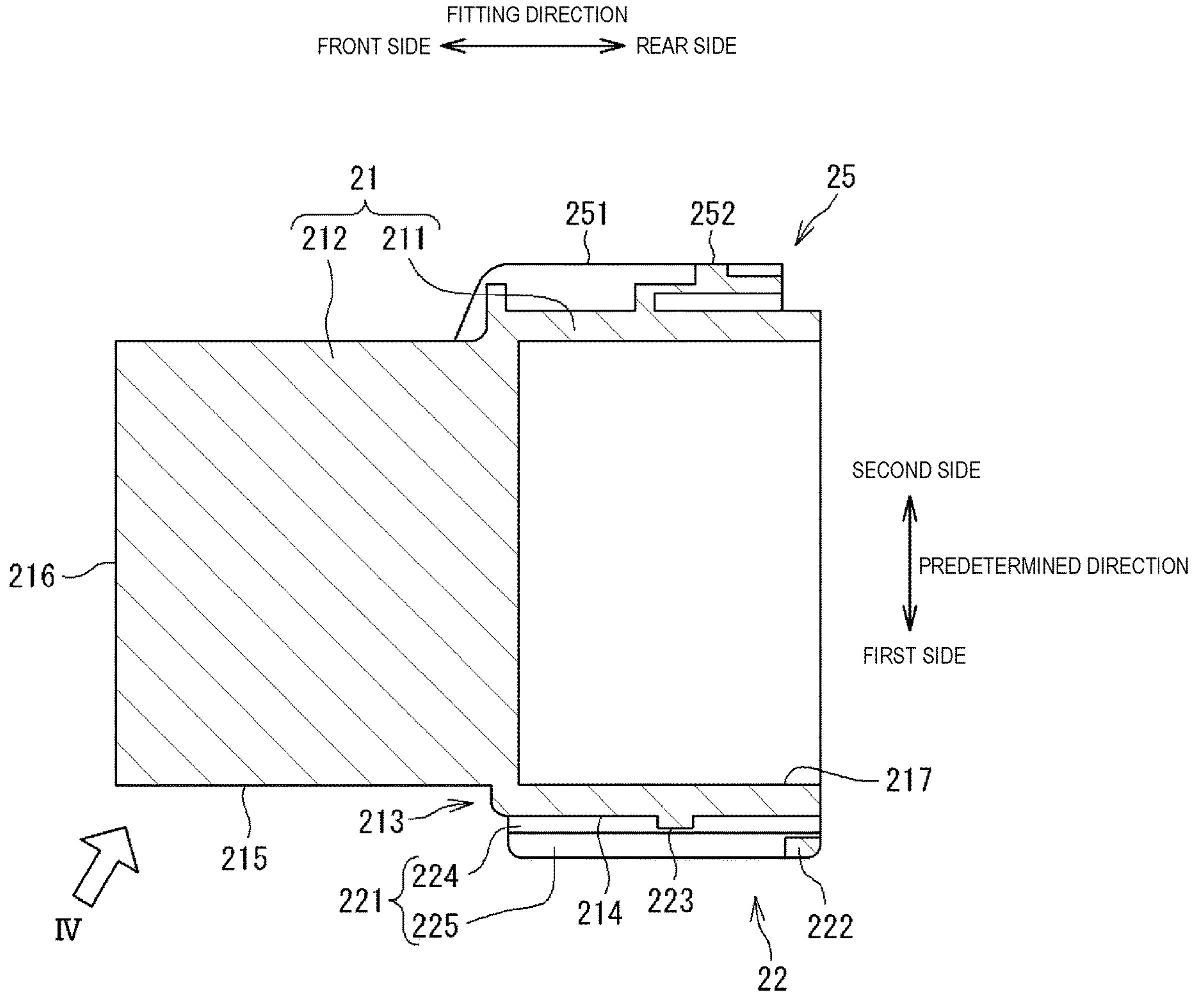
FIG. 3 is a cross-sectional view taken along line III-III in FIG. 2.
Figure 4:
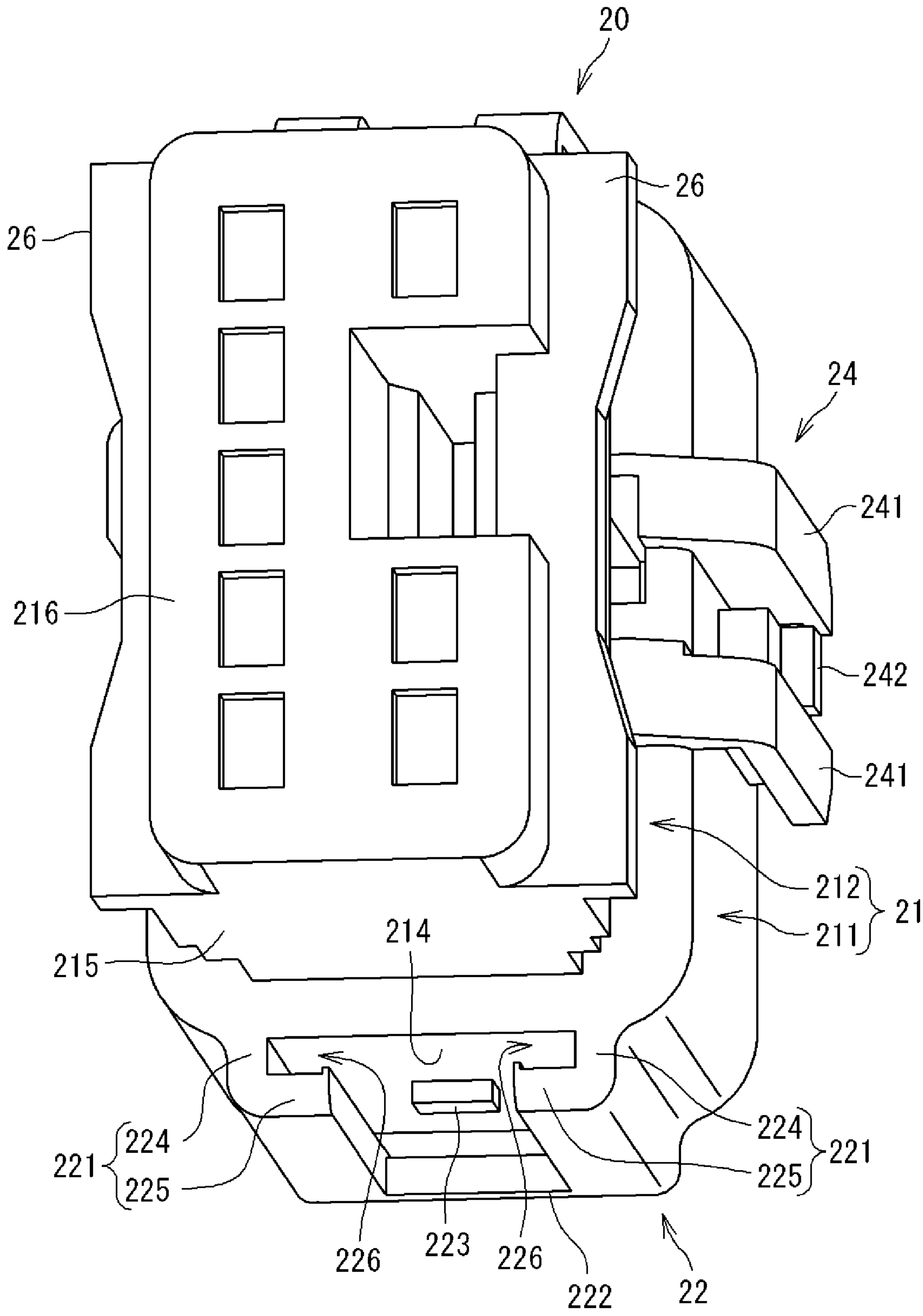
FIG. 4 is a perspective view from obliquely below the connector according to the embodiment.

The connector 20 of this embodiment will be described with reference to FIGS. 2 to 4.

Figure 2:
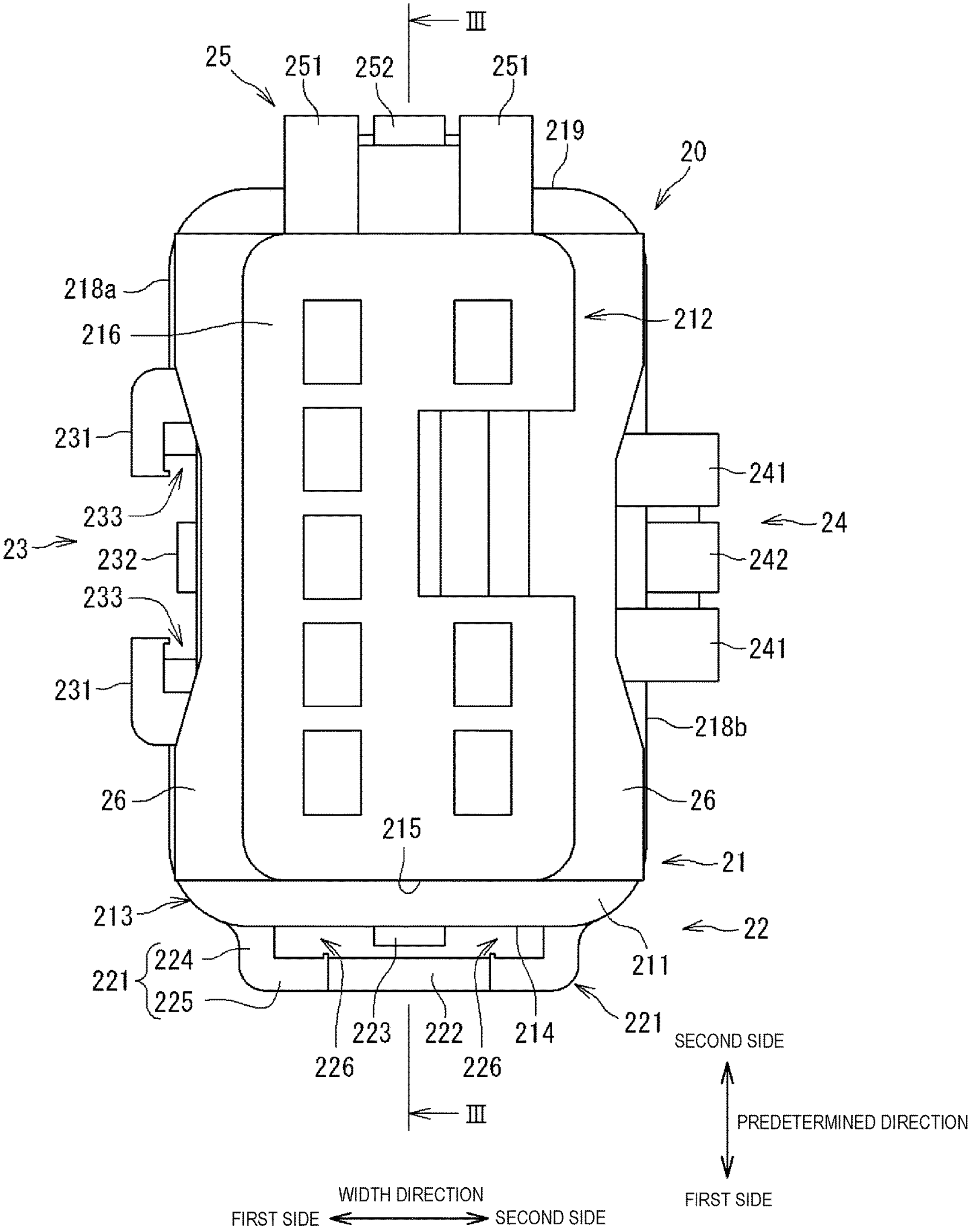
FIG. 2 is a front view of a connector according to the embodiment.

FIG. 2 is a front view of the connector 20. FIG. 3 is a cross-sectional view taken along line III-III in FIG. 2. FIG. 4 is a perspective view of the connector 20 viewed from the lock portion 22 side, as indicated by arrow IV in FIG. 3.

The connector 20 is a resin female connector provided at the end of a wire harness (not shown). As shown in FIG. 2, the connector 20 has a main body portion 21, a lock portion

22, a first connecting portion 23, a second connecting portion 24, and a third connecting portion 25. The lock portion 22, the first connecting portion 23, the second connecting portion 24, and the third connecting portion 25 are formed in one piece with the main body portion 21 (specifically, a later-described second portion 212).

Here, each direction of the connector 20 will be defined. A direction in which the connector 20 is fitted in the holder 30 is called a "fitting direction". The side on which the connector 20 is fitted in the holder 30 is called a "front side" in the fitting direction, and the side on which the connector 20 is withdrawn from the holder 30 is called a "rear side" in the fitting direction. The near side relative to the paper surface of FIG. 2 is the front side in the fitting direction. Also, the direction in which the lock portion 22 and the third connecting portion 25 are formed with respect to the main body portion 21 is referred to as a "predetermined direction". With the main body portion 21 as the center, the lock portion 22 side is called a "first side" in the predetermined direction, and the third connecting portion 25 side is called a "second side" in the predetermined direction. The lower side of FIG. 2 is the first side in the predetermined direction. Also, the direction in which the first connecting portion 23 and the second connecting portion 24 are formed with respect to the main body portion 21 is referred to as a "width direction". With the main body portion 21 as the center, the first connecting portion 23 side is referred to as the "first side" in the width direction, and the second connecting portion 24 side is referred to as the "second side" in the width direction. The left side of FIG. 2 is the first direction in the width direction.

In this embodiment, the fitting direction, the predetermined direction, and the width direction are directions orthogonal to each other. Note that the fitting direction, the predetermined direction, and the width direction need only intersect each other, and do not necessarily have to be orthogonal to each other. For example, the fitting direction, the predetermined direction, and the width direction may obliquely cross each other within a range of 70 degrees or more and 120 degrees or less.

The main body portion 21 will be described with reference to FIGS. 2 and 3.

The main body portion 21 has a first portion 211 and a second portion 212. Both the first portion 211 and the second portion 212 are portions having a substantially cuboid shape that is longer in the predetermined direction than in the width direction. The second portion 212 is a portion that extends from the first portion 211 to the front side in the fitting direction. The width in the predetermined direction of the first portion 211 is greater than the width in the predetermined direction of the second portion 212, and the width in the width direction of the first portion 211 is greater than the width in the width direction of the second portion 212.

A level difference 213 is formed at the boundary on the first side in the predetermined direction between the first portion 211 and the second portion 212. That is, a second face 215, which is a face on the first side in the predetermined direction of the second portion 212, is located on the second side in the predetermined direction with respect to a first face 214, which is a face on the first side in the predetermined direction of the first portion 211. A terminal (not shown) that is electrically connected to the second end 14*b* (FIG. 1) of the wire harness 14 is provided on a leading end face 216, which is a face on the front side in the fitting direction of the second portion 212.

The second portion 212 has a pair of projecting portions 26, 26. The pair of projecting portions 26, 26 are provided respectively protruding outward in the width direction from the side faces on the first and second sides in the width direction of the second portion 212. The projecting portion 26 is a member for suppressing tilting of the connector 20 by coming into contact with a later-described second contact portion 34 when the connector 20 tilts.

A connection hole 217 that is open rearward in the fitting direction is formed in the first portion 211. A male connector (not shown) is inserted into the connection hole 217 in the fitting direction, and the male connector and the second end 14*b* are electrically connected via the terminals of the connector 20.

The lock portion 22 will be described with reference to FIG. 4.

The lock portion 22 is provided protruding from the first face 214 of first portion 211 toward the first side in the predetermined direction. The lock portion 22 has a pair of guide ribs 221, 221, a coupling portion 222, and a locking projection 223.

The pair of guide ribs 221, 221 are members that each have a substantially L-shaped cross section and extend in the fitting direction. The pair of guide ribs 221, 221 each have an insertion portion 224 and a cover portion 225. The insertion portion 224 is a portion that protrudes from the first face 214 of the first portion 211 toward the first side in the predetermined direction. The cover portion 225 is a portion that protrudes inward in the width direction from the end on the first side in the predetermined direction of the insertion portion 224. The pair of guide ribs 221, 221 each form a groove 226. The groove 226 is a space surrounded by the first face 214, the insertion portion 224, and the cover portion 225, and is a space into which a later-described lock piece 321 is inserted.

The coupling portion 222 is a portion that couples the pair of guide ribs 221, 221 in the width direction, and is connected to the cover portion 225 on the first side in the width direction and the cover portion 225 on the second side in the width direction. The locking projection 223 is provided protruding from the first face 214 to the first side in the predetermined direction between the pair of guide ribs 221, 221. The height of the locking projection 223 from the first face 214 is lower than the height of the insertion portion 224 from the first face 214. For this reason, as shown in FIG. 2, the coupling portion 222 and the cover portion 225 are located on the first side in the predetermined direction with respect to the locking projection 223.

The first connecting portion 23, the second connecting portion 24 and the third connecting portion 25 will be described next with reference to FIG. 2.

A plurality of the connectors 20 can be arranged side by side in the predetermined direction or the width direction and connected to each other. When arranging a plurality of connectors 20 side by side in the width direction, the first connecting portion 23 of a connector 20 is connected to the second connecting portion 24 of another adjacent connector 20. Also, when arranging a plurality of connectors 20 side by side in the predetermined direction, the third connecting portion 25 of a connector 20 is connected to the locking portion 22 of another adjacent connector 20.

The first connecting portion 23 has a pair of guide ribs 231, 231 extending in the fitting direction and a locking projection 232. The pair of guide ribs 231, 231 and the locking projection 232 are provided protruding from a side face 218*a* on the first side in the width direction of the first portion 211. Each of the pair of guide ribs 231, 231 forms a substantially L-shaped cross section with a portion protruding to the first side in the width direction and a portion protruding inward in the predetermined direction from the end on the first side in the width direction. A pair of grooves 233, 233 are formed by the pair of guide ribs 231 and the side face 218*a*.

The second connecting portion 24 has a pair of lock pieces 241, 241 extending in the fitting direction and a locking projection 242. The pair of lock pieces 241, 241 and the locking projection 242 are provided protruding from the side face 218*b* on the second side in the width direction of the first portion 211. The pair of lock pieces 241, 241 each form a substantially L-shaped cross-section obtained by rotating the pair of guide ribs 231, 231 180 degrees, by a portion protruding to the second side in the width direction and a portion protruding outward in the predetermined direction from the end on the second side in the width direction. The lock piece 241 has a shape corresponding to the groove 233 of the other adjacent connector 20. The locking projection 242 is a member for locking with the locking projection 232 of the other connector 20 in the fitting direction.

For example, by bringing the connector 20 closer to the other connector 20 adjacent in the width direction from the rear side to the front side in the fitting direction, the pair of locking pieces 241, 241 are inserted in the pair of grooves 233 of the other connector 20. By elastically deforming the locking projection 232 of the other connector 20 in the width direction, the locking projection 242 passes over the locking projection 232 in the fitting direction, and the locking projection 242 and the locking projection 232 of the other connector 20 are locked to each other. Accordingly, the second connecting portion 24 is connected to the first connecting portion 23 of the other connector 20. Note that the first connecting portion 23 and the second connecting portion 24 are not limited to the shapes of the present embodiment as long as they have shapes that can be connected to each other.

The third connecting portion 25 has a pair of lock pieces 251, 251 extending in the fitting direction and a locking projection 252. The pair of lock pieces 251, 251 and the locking projection 252 are provided protruding from a face 219 on the second side in the predetermined direction of the first portion 211. The pair of lock pieces 251, 251 each form a substantially L-shaped cross section obtained by rotating the pair of guide ribs 221, 221 by 180 degrees, with a portion protruding to the second side in the predetermined direction and a portion protruding outward in the width direction from the end on the second side in the predetermined direction. The lock piece 251 has a shape corresponding to the groove 226 of the other connector 20 adjacent thereto. The locking projection 252 is a member for locking with the locking projection 223 of the other connector 20 in the fitting direction.

For example, by bringing the connector 20 closer to another connector 20 adjacent in a predetermined direction from the rear side to the front side in the fitting direction, the pair of lock pieces 251, 251 are inserted in the pair of grooves 226 of the other connector 20. By elastically deforming the locking projection 223 of the other connector 20 in the width direction, the locking projection 252 passes over the locking projection 223 in the fitting direction, and the locking projection 252 and the locking projection 223 of the other connector 20 are locked to each other. As a result, the third connecting portion 25 is connected to the lock portion 22 of the other connector 20. Note that the third connecting portion 25 is not limited to the shape of the present embodiment as long as it has a shape capable of connection with the lock portion 22.

Configuration of Holder

The holder 30 of this embodiment will be described with reference to FIGS. 5 to 7.

Figure 5:
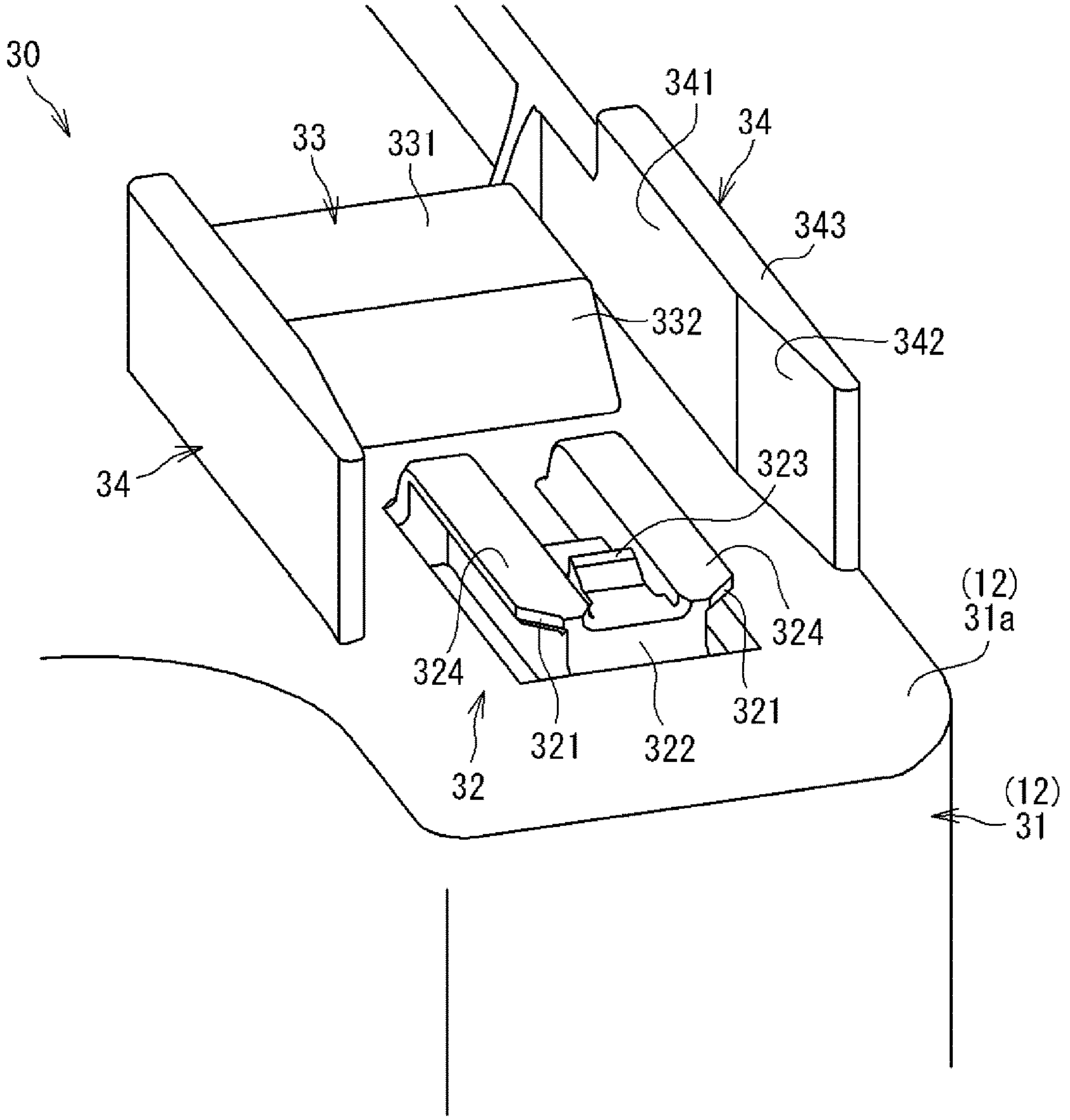
FIG. 5 is a perspective view showing a holder according to the embodiment.
Figure 6:
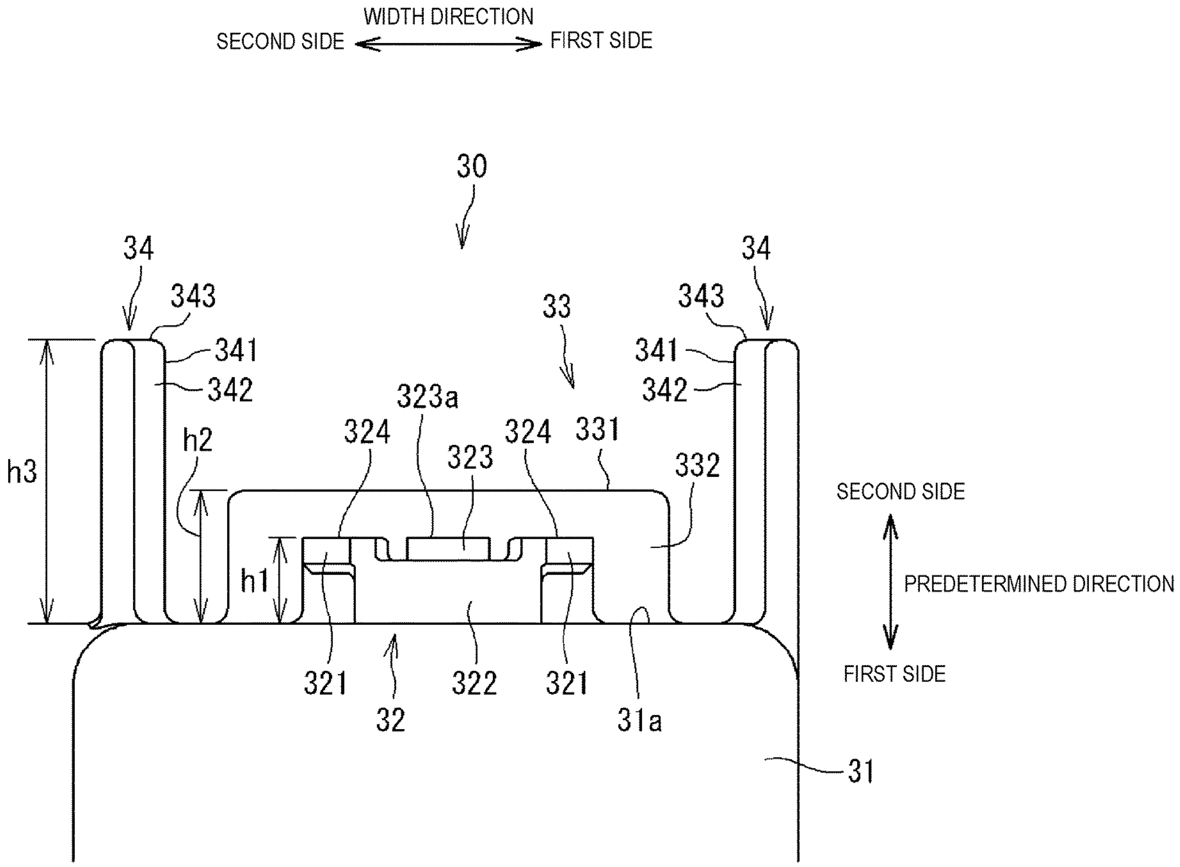
FIG. 6 is a rear view of the holder according to the embodiment.

FIG. 5 is a perspective view of the holder 30. FIG. 6 is a rear view of the holder 30 from the rear side in the fitting direction. FIG. 7 is a plan view of the holder 30 from the second side in a predetermined direction.

The holder 30 is a resin member for fixing the connector 20. The holder 30 has a base portion 31, a locked portion 32, a first contact portion 33, and a pair of second contact portions 34, 34. In this embodiment, the base portion 31 of the holder 30 is part of the case 12 and a surface 31*a* of the base portion 31 is part of the outer wall 12*a* of the case 12. The locked portion 32, the first contact portion 33, and the pair of second contact portions 34, 34 are members formed in one piece with the base portion 31, and are provided protruding from the surface 31*a* toward the second side in the predetermined direction.

The locked portion 32 is a member that fits with the lock portion 22 of the connector 20. The locked portion 32 has a pair of lock pieces 321, 321 extending in the fitting direction, a column portion 322, and a locking projection 323. The pair of lock pieces 321, 321 each form a substantially L-shaped cross-section obtained by rotating the pair of guide ribs 221, 221 180 degrees, by a portion protruding to the second side in the predetermined direction and a portion protruding outward in the end direction from the end on the second side in the predetermined direction. The lock piece 321 has a shape corresponding to the groove 226 of the connector 20.

The column portion 322 is provided between the pair of lock pieces 321, 321, and increases the strength of the locked portion 32 by joining the pair of lock pieces 321, 321 in the width direction. The locking projection 323 is a member for locking with the locking projection 223 of the connector 20 in the fitting direction. The locking projection 323 is provided protruding from the vicinity of the center in the fitting direction of the column portion 322 to the second side in the predetermined direction. As shown in FIG. 6, the end face 323*a* on the second side in the predetermined direction of the locking projection 323 is at the same position in the predetermined direction (or a position at which the end face 323*a* is located slightly toward the second side in the predetermined direction relative to the faces 324, 324) as the faces 324, 324 on the second side in the predetermined direction of the pair of lock pieces 321, 321.

The first contact portion 33 faces the second portion 212 of the connector 20 in a predetermined direction, and is a member for suppressing tilting of the connector 20 by coming into contact the second face 215 of the second portion 212 when the connector 20 tilts. The first contact portion 33 has a contact face 331 and an inclined face 332. As shown in FIG. 7, the first contact portion 33 is provided on the front side in the fitting direction of the locked portion 32.

The contact face 331 is a face parallel to the surface 31*a*. The contact face 331 is a face that comes into contact with the second face 215 when the connector 20 tilts. The inclined face 332 is a face that is provided on the rear side in the fitting direction of the first contact portion 33 (i.e., is provided on the rear side in the fitting direction of the contact face 331), and is inclined such that the height from the surface 31*a* increases from the rear side in to the front side in the fitting direction. The inclined face 332 is a face that guides the second portion 212 of the connector 20 when the connector 20 is fitted in the holder 30.

The pair of second contact portions 34, 34 face the side faces 218*a*, 218*b* and the pair of projecting portions 26, 26 of the connector 20, and are members for suppressing tilting of the connector 20 by coming into contact with the side faces 218*a*, 218*b* and the pair of projecting portions 26, 26 when the connector 20 tilts. The pair of second contact portions 34, 34 are also members for guiding the connector 20 when fitting the connector 20 to the holder 30.

Each of the pair of second contact portions 34, 34 is a plate-shaped member extending in the fitting direction. The second contact portion 34 has a contact face 341, an inclined face 342 and an upper end face 343. The contact face 341 is a face extending in the fitting direction and the predetermined direction. The distance in the width direction between the pair of contact faces 341, 341 is slightly greater than the width between the side faces 218*a*, 218*b* of the connector 20 and the width between the pair of projecting portions 26, 26, and the connector 20 can be inserted between the pair of contact faces 341, 341.

The inclined face 342 is a face on the rear side in the fitting direction and on the inner side in the width direction, and is a face that inclines toward the inner side in the width direction from the rear side toward the front side in the fitting direction. The distance in the width direction between the pair of inclined faces 342, 342 gradually decreases from the rear side toward the front side in the fitting direction. For this reason, the pair of inclined faces 342, 342 are faces that guide the second portion 212 of the connector 20 when fitting the connector 20 to the holder 30. The upper end face 343 is a face on the second side in the predetermined direction of the second contact portion 34.

Here, the height of each portion of the holder 30 from the surface 31*a* will be described with reference to FIG. 6. A height h2 of the contact face 331 is higher than a height h1 of the pair of lock pieces 321, 321, and a height h3 of the upper end face 343 is higher than the height h2 of the contact face 331 (h1<h2<h3). More specifically, the height h3 of the upper end face 343 is about twice the height h2 of the contact face 331 and about 3.5 times the height h1 of the pair of lock pieces 321, 321 (h3≈2×h2, h3≈3.5×h1).

Due to the height h3 of the upper end face 343 (i.e., the height of the second contact portion 34) being sufficiently (for example, twice or more) higher than the heights h1 and h2 of the lock piece 321 and the contact face 331) in this manner, the contact face 341 can more reliably come into contact with the connector 20 tilting in the width direction, and the tilting of the connector 20 can be suppressed more suitably.

Figure 7:
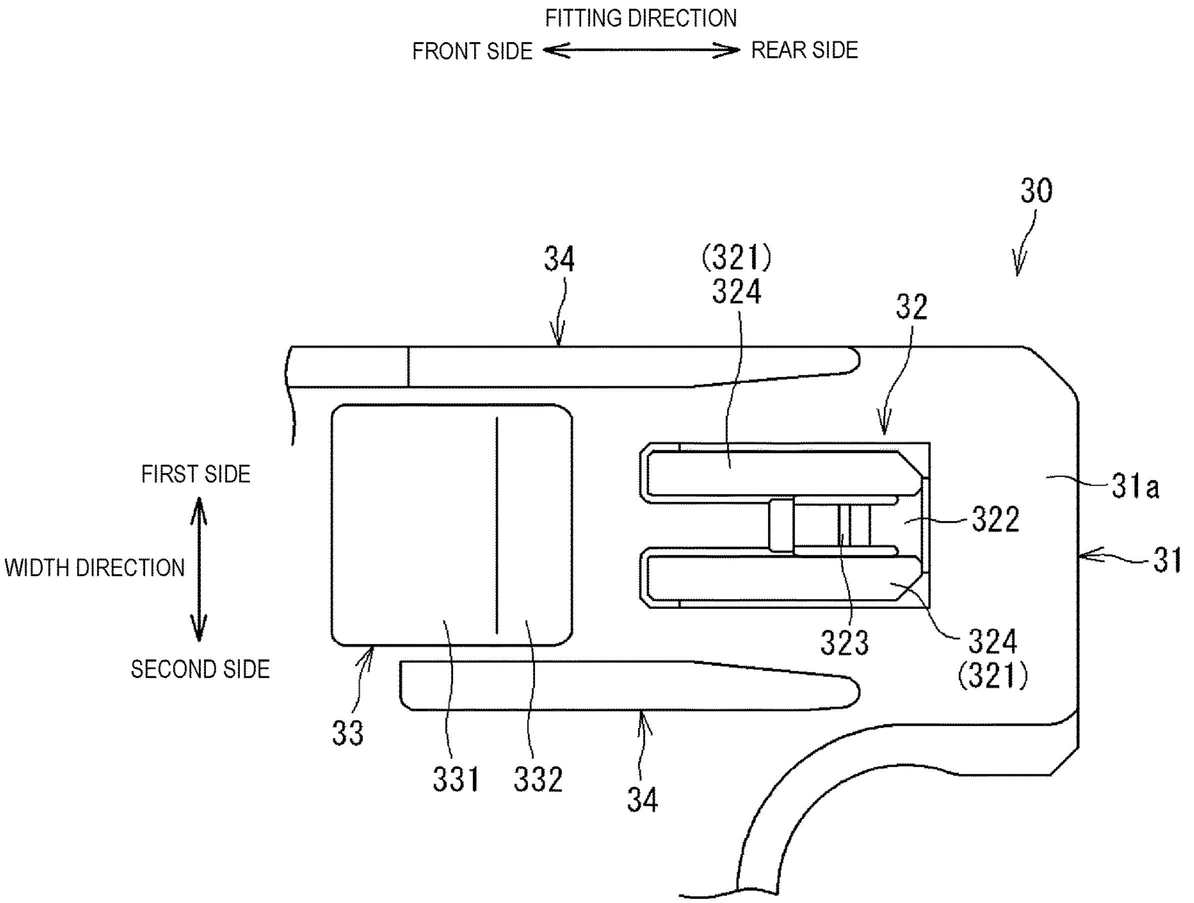
FIG. 7 is a plan view of the holder according to the embodiment.

As shown in FIG. 7, the pair of second contact portions 34, 34 according to the present embodiment are spaced apart from the first contact portion 33 in the width direction. However, in order to increase the strength of the first contact portion 33 and the second contact portion 34, a coupling portion that couples the first contact portion 33 and the second contact portion 34 in the width direction may be further provided. In this case, it is preferable that the coupling portion is provided at a height lower than the height h2 of the contact face 331, for example, so as to avoid the position where the connector 20 is fitted.

Configuration of Connector Fixing Structure

A connector fixing structure 11 according to the present embodiment will be described with reference to FIGS. 8 to 11. The connector fixing structure 11 includes the holder 30 and the connector 20 fitted in the holder 30.

Figure 8:
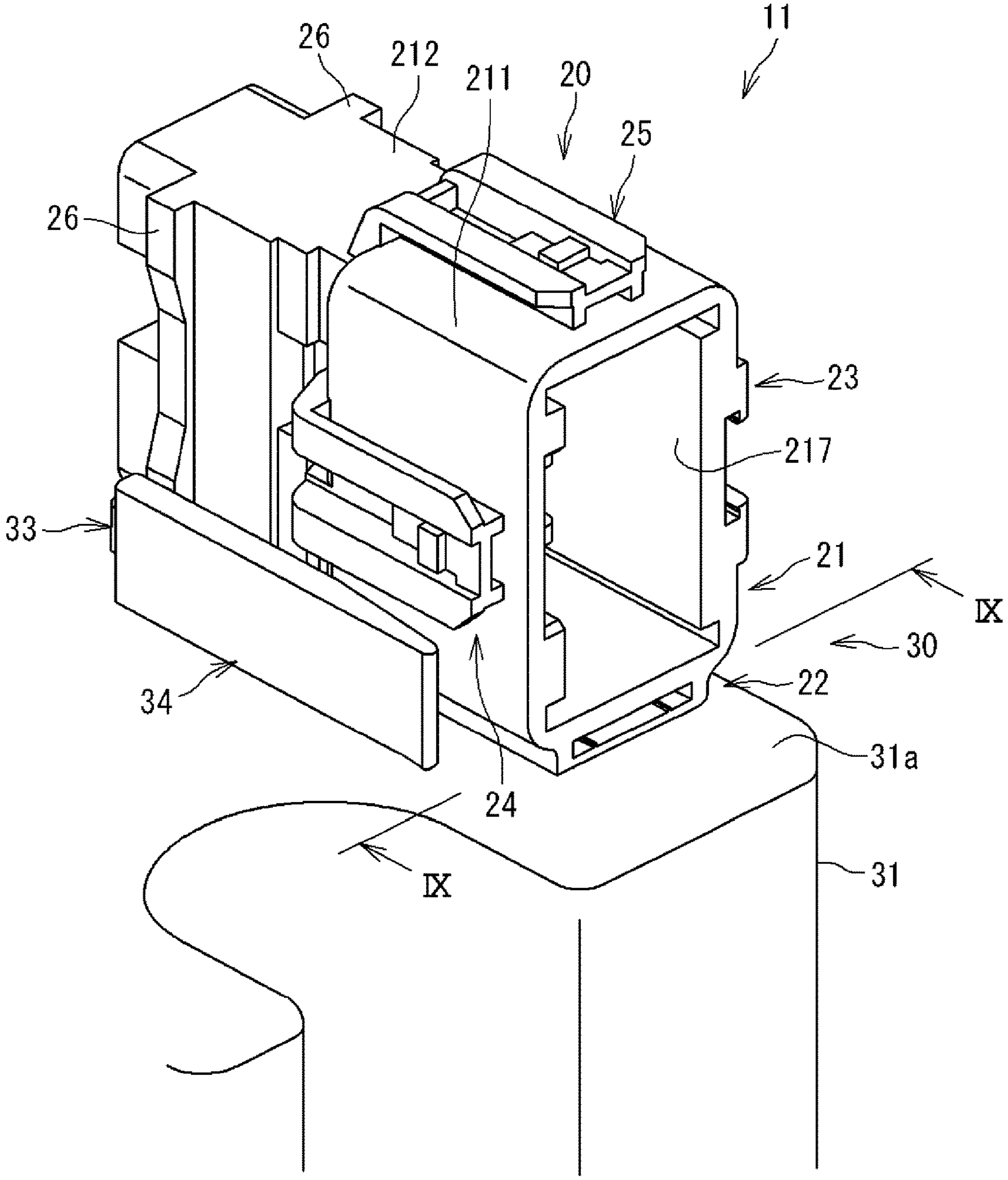
FIG. 8 is a perspective view of a connector fixing structure according to the embodiment.
Figure 9:
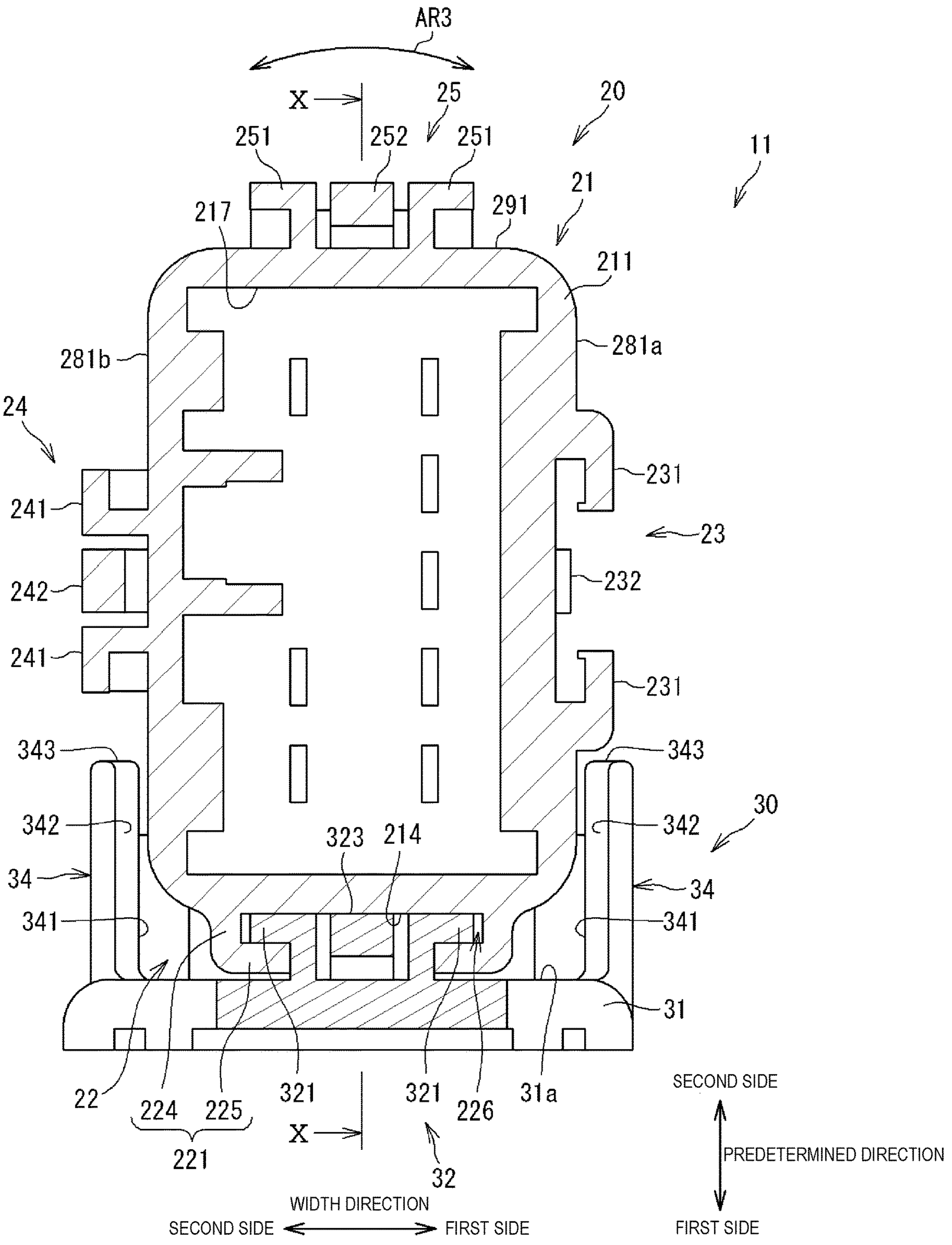
FIG. 9 is a cross-sectional view taken along line IX-IX of FIG. 8.
Figure 10:
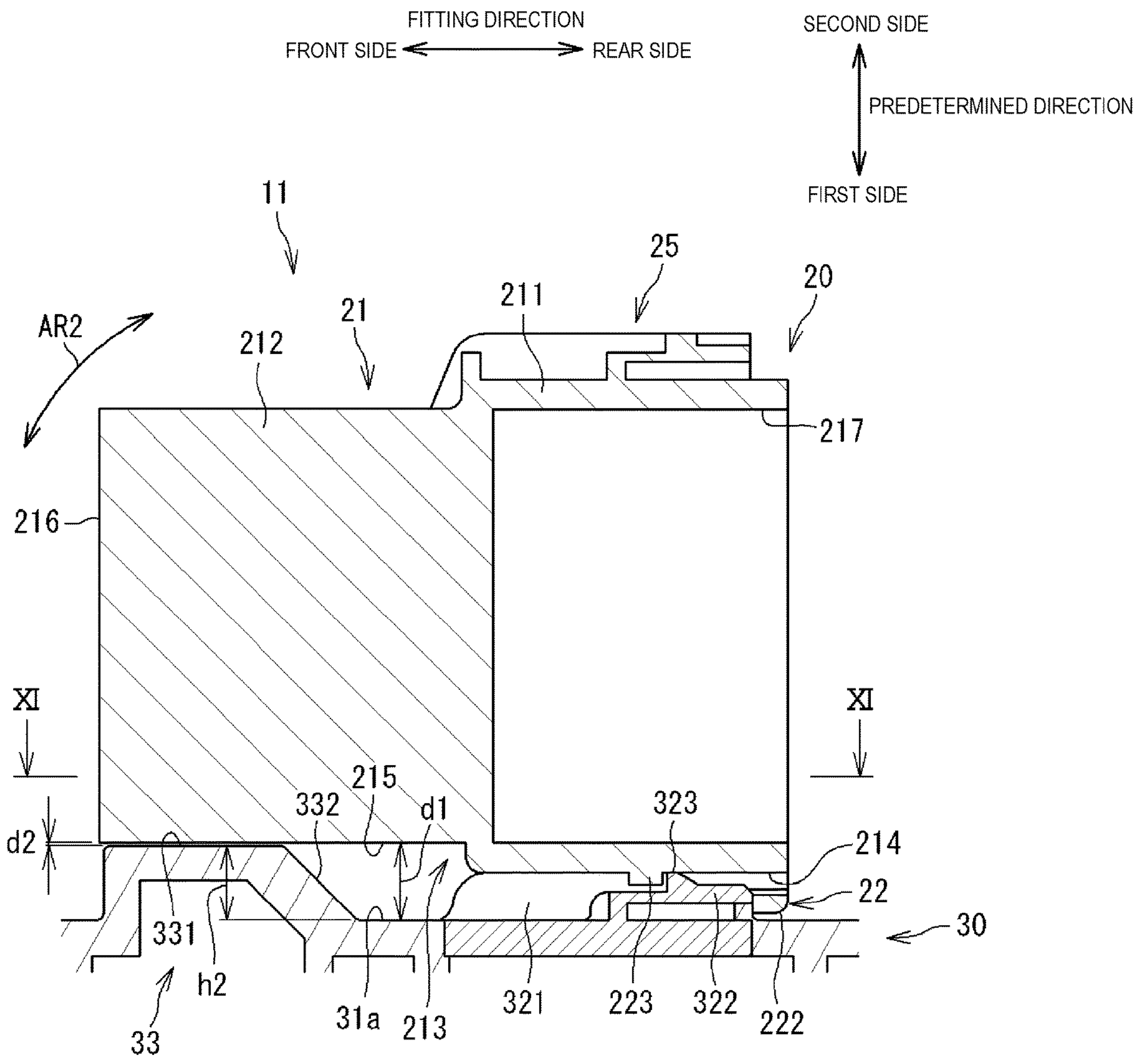
FIG. 10 is a cross-sectional view taken along line X-X of FIG. 9.
Figure 11:
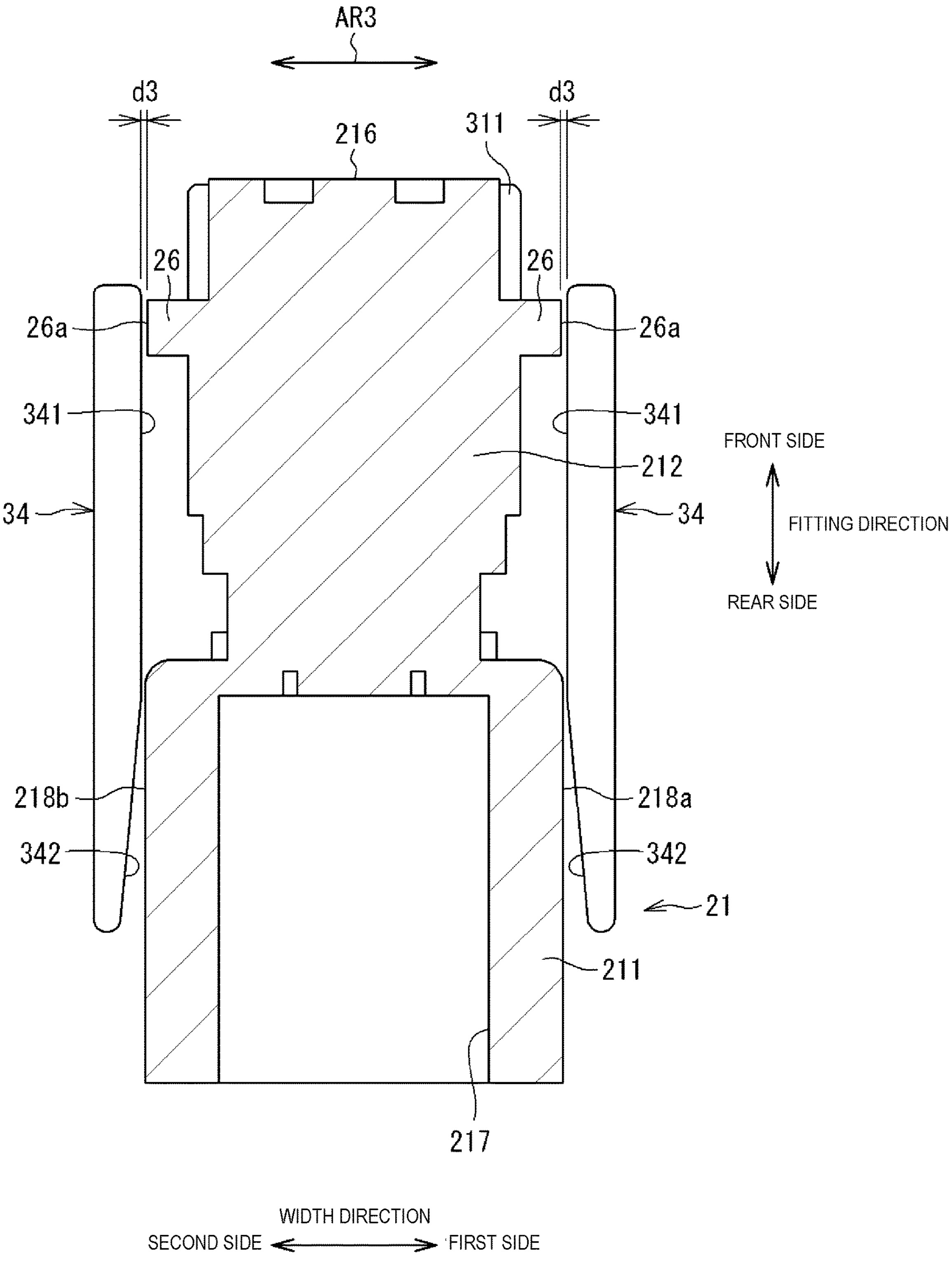
FIG. 11 is a cross-sectional view taken along line XI-XI of FIG. 10.
Figure 12:
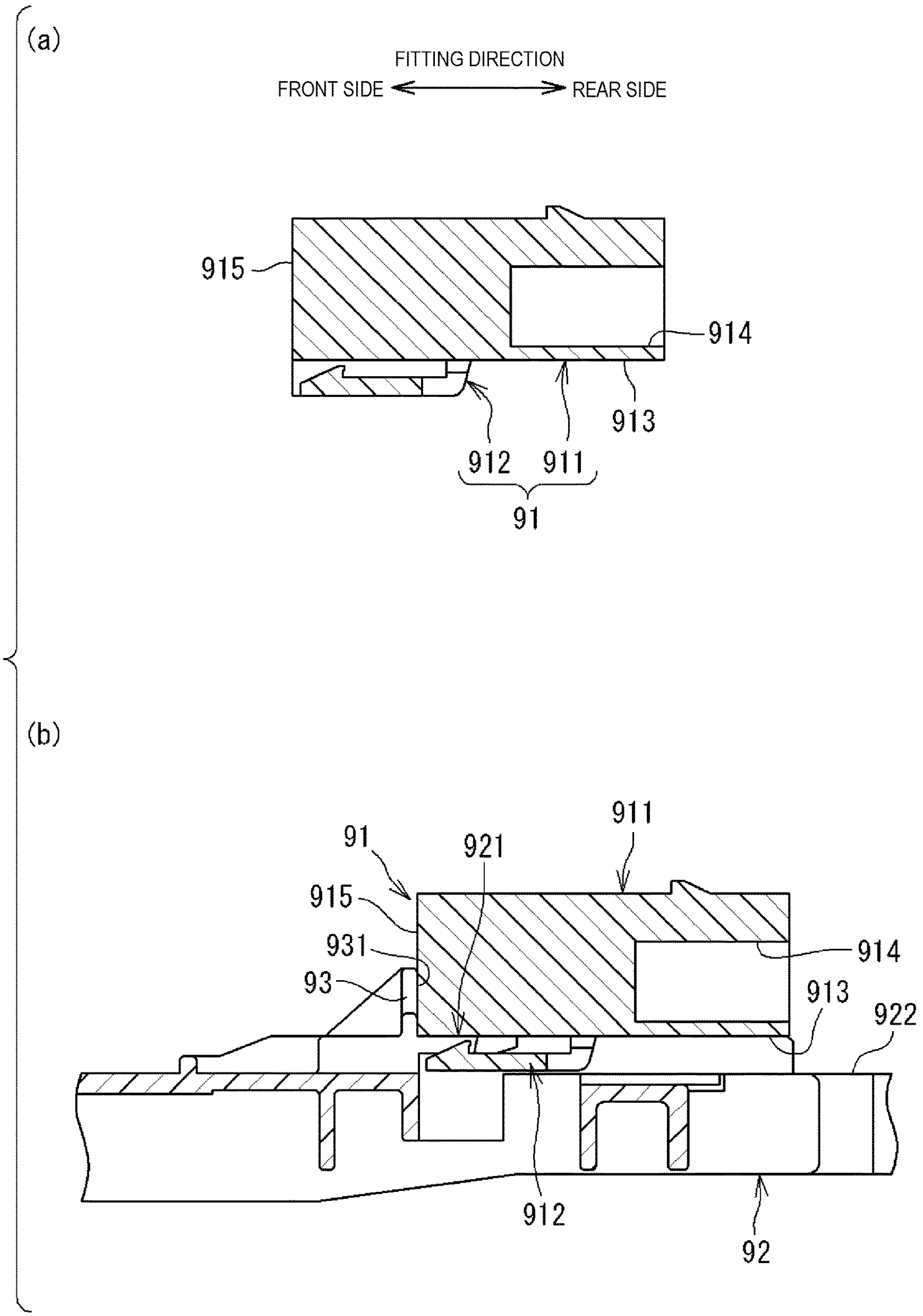
FIG. 12 is a diagram illustrating a conventional technique.

FIG. 8 is a perspective view of the connector fixing structure 11 from the same angle as in FIG. 5. FIG. 9 is a cross-sectional view taken along line IX-IX of FIG. 8. FIG. 9 shows a cross section in the width direction and the predetermined direction including the locking projection 323. FIG. 10 is a cross-sectional view taken along line X-X in FIG. 9. FIG. 11 is a cross-sectional view taken along line XI-XI of FIG. 10.

First, a method for fitting the connector 20 in the holder 30 will be described. By bringing the lock portion 22 of the connector 20 closer to the locked portion 32 of the holder 30 from the rear side toward the front side in the fitting direction, the pair of locking pieces 321, 321 are inserted into the pair of grooves 226, 226 as shown in FIG. 9.

Ideally, the connector 20 is brought close to the holder 30 upright in the fitting direction, but in actuality, there are cases where the connector 20 undergoing fitting tilts in the predetermined direction and the width direction since a worker brings the connector 20 closer to the holder 30 manually. In this embodiment, if the connector 20 undergoing fitting tilts to the first side in the predetermined direction, the inclined face 332 of the first contact portion 33 comes into contact with the connector 20 (e.g., the end on the first side in the predetermined direction of the leading end face 216), whereby the connector 20 can be guided in the fitting direction while reducing the inclination in the predetermined direction of the connector 20. Also, if the connector 20 undergoing fitting tilts in the width direction, the inclined face 342 of the second contact portion 34 comes into contact with the connector 20 (e.g., the end on the outer side in the width direction of the leading end face 216), whereby the connector 20 can be guided in the fitting direction while reducing the inclination in the width direction of the connector 20. By providing the inclined faces 332 and 342 in this manner, it is possible to prevent the connector 20 from getting stuck during fitting.

Then, the locking projection 223 of the connector 20 elastically deforms the locking projection 323 of the holder 30 in a predetermined direction, thereby passing over the locking projection 323 in the fitting direction, and the locking projection 223 and the locking projection 323 are locked to each other as shown in FIG. 10. As a result, the locking portion 22 is fixed to the locked portion 32 while being prevented from coming off rearward in the fitting direction. Note that when the connector 20 is fitted in the holder 30, the locking projection 223 and the locking projection 323 may also be positioned with a slight gap therebetween in the fitting direction.

Here, since the connector fixing structure 11 is provided as part of the in-vehicle electrical connection box 10, vibration continuously acts on the connector fixing structure 11 due to the traveling of the vehicle, driving of the engine, and the like. When the vibration acts, the connector 20 fitted in the holder 30 tilts with the lock portion 22 serving as a fulcrum. For example, the connector 20 tilts in a direction including the fitting direction and the predetermined direction as indicated by arrow AR2 in FIG. 10, or tilts in a direction including the width direction and the predetermined direction as indicated by arrow AR3 in FIGS. 9 and 11.

In particular, the connector 20 of the present embodiment tends to tilt significantly in the direction indicated by the arrow AR2 with the lock portion 22 serving as a fulcrum. This is because, for example, the second portion 212 is shorter in the predetermined direction than the first portion 211 and there is a first gap d1 between the second portion 212 and the surface 31*a*, and because the lock portion 22 is provided in the first portion 211 and the connector 20 is cantilevered from the first portion 211 toward the second portion 212.

Also, since the connector 20 has a shape that is longer in the predetermined direction than in the width direction, it tends to tilt significantly in the direction indicated by the arrow AR3 with the lock portion 22 serving as a fulcrum. Furthermore, for example, when the connector 20 is fitted in the holder 30 while the third connecting portion 25 (or the first connecting portion 23, the second connecting portion 24) is connected to another connector 20, the center of gravity is farther from the lock portion 22 by an amount corresponding to the other connector 20, and the connector 20 tends to tilt more significantly.

When the connector 20 tilts, the locking portion 22 and the locked portion 32 become brittle due to continuous repetition of elastic deformation, and therefore there is a risk that the lock portion 22 and the locked portion 32 will be damaged earlier than in the case where the connector 20 does not tilt at all. That is, there is a risk that the durable lifespan of the connector fixing structure 11 will be shortened. In view of this, in the present embodiment, the tilting of the connector 20 is suppressed by installing the first contact portion 33 and the pair of second connecting portions 34, 34 in the range in which the connector 20 tilts and bringing the tilting connector 20 into contact with at least one of the first contact portion 33 and the pair of second contact portions 34, 34.

The first contact portion 33 and the pair of second contact portions 34, 34 oppose the connector 20 in the reference orientation with later-described predetermined gaps d2, d3. Here, the "reference orientation" of the connector 20 means the orientation in the state where no external force is being applied to the connector 20 fitted in the holder 30 and the connector 20 is not tilting. FIGS. 8 to 11 show the connector 20 in the reference orientation.

The positional relationship between the second portion 212 in the reference orientation and the first contact portion 33 will be described with reference to FIG. 10. In a state in which the connector 20 is fitted in the holder 30, the second portion 212 opposes the surface 31*a* with a predetermined first gap d1 in the predetermined direction therebetween. At least a portion of the first contact portion 33 (as shown in FIG. 11, in this embodiment, most of the portion excluding a portion on the outside in the width direction) is accommodated in the first gap d1.

The second face 215 of the second portion 212 and the contact face 331 of the first contact portion 33 oppose each other with a predetermined second gap d2 in the predetermined direction therebetween. The second gap d2 is narrower than the first gap d1 (d2<d1). Also, the second gap d2 is narrower than the maximum width by which the connector 20 tilts from the reference orientation toward the first side in the predetermined direction when the first contact portion 33 is not provided. For this reason, when the connector 20 tilts from the reference orientation, the connector 20 comes into contact with the first contact portion 33 during tilting. More specifically, the second face 215 of the second portion 212 comes into contact with the contact face 331 of the first contact portion 33 before the connector 20 swings over the maximum tilting width.

When the connector 20 swings to the maximum tilting width, the lock portion 22 and the locked portion 32 are significantly elastically deformed by a corresponding amount. The first contact portion 33 stops the tilting of the connector 20 (narrows the width of the tilting) during the tilting of the connector 20 by coming into contact with the second portion 212. As a result, the degree of elastic deformation of the lock portion 22 and the locked portion 32 can be suppressed, and shortening of the durable lifespan of the connector fixing structure 11 due to tilting can be suppressed.

Note that the first contact portion 33 may also come into contact with the second portion 212 in the reference orientation. In this case, the height h2 of the contact face 331 is equal to the first gap d1, and the second gap d2 is eliminated. That is, the first contact portion 33 may come into contact with the connector 20 in the non-tilted state from the beginning, and the second portion 212 may be almost completely prevented from swinging toward the surface 31*a*.

However, if the height h2 of the contact face 331 is designed to be equal to the first gap d1, the height h2 may become slightly larger than the first gap d1 due to the influence of the tolerance of the connector 20 and the holder 30, and the like. In this case, the second portion 212 in the reference orientation rides up onto the first contact portion 33, and the connector 20 is always tilted. As a result, the lock portion 22 and the locked portion 32 are always elastically deformed, and there is a risk that the durable lifespan of the connector fixing structure 11 will be shortened instead.

Also, when the first contact portion 33 comes into contact with the connector 20 in the non-tilted state from the beginning, there is a case where a force acts on the lock portion 22 and the locked portion 32 with the second portion 212 and the first contact portion 33 serving as the fulcrum. In this case, compared to the case where the connector 20 tilts with the lock portion 22 serving as the fulcrum, the distance between the contact portion between the second portion 212 and the first contact portion 33 (fulcrum) and the lock portion 22 and locked portion 32 (action point) is greater, and therefore there is a risk that a greater force will be applied to the lock portion 22 and the locked portion 32 instead.

For this reason, in the present embodiment, the height h2 of the contact face 331 is set lower than the first gap d1 (h2<d1), and the second gap d2 is provided between the contact face 331 and the second face 215. As a result, it is possible to suppress the tilting of the connector 20 and prevent excessive force from being applied to the lock portion 22 and the locked portion 32 when the connector 20 does not tilt.

Also, in the present embodiment, the fulcrum of the tilting of the connector 20 is limited to the lock portion 22 by preventing the connector 20 in the reference orientation from coming into contact with the holder 30 at a portion other than the lock portion 22. As a result, it is possible to prevent a larger force from acting on the lock portion 22 and the locked portion 32 due to an unintended location serving as a fulcrum. As a result, shortening of the durable lifespan of the connector fixing structure 11 can be suppressed more reliably.

Figure 13:
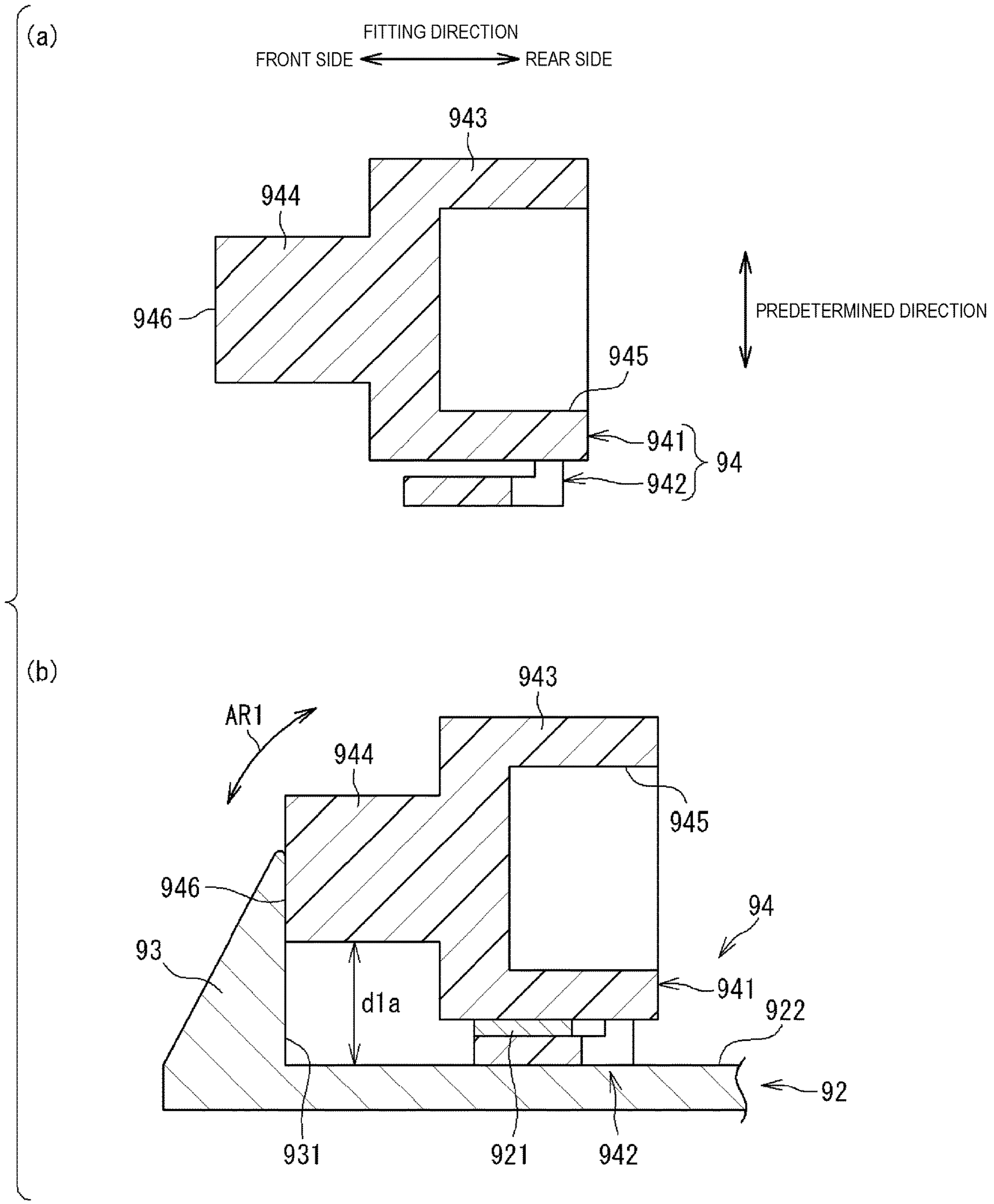
FIG. 13 is a diagram illustrating a problem to be solved of the present disclosure.

The first contact portion 33 opposes the second face 215 in the predetermined direction and comes into contact with the tilting connector 20 in the predetermined direction, and therefore the tilting of the connector 20 can be suppressed more suitably than in the example shown in FIG. 13. Also, since the first contact portion 33 is provided so as to oppose the second portion 212 in a predetermined direction on the rear side in the fitting direction with respect to the leading end face 216, the connector fixing structure 11 can be made smaller in the fitting direction. That is, the distance from the rear side in the fitting direction of the locked portion 32 of the holder 30 to the front side in the fitting direction of the first contact portion 33 is shorter than the length in the fitting direction of the connector 20, and the locked portion 32 and the first contact portion 33 do not protrude from connector 20 in the fitting direction. For this reason, it is possible to suppress tilting of the connector 20 by the holder 30, and the size of the connector fixing structure 11 can be reduced in the fitting direction compared to the case where the conventional holder 92 shown in FIG. 13 is employed.

The positional relationship between the connector 20 in the reference orientation and the pair of second contact portions 34 will be described with reference to FIGS. 9 and 11. In the state in which the connector 20 is fitted in the holder 30, the upper end face 343 is located on the first side in the predetermined direction with respect to the first connecting portion 23 and the second connecting portion 24. Also, the side faces 218*a* and 218*b* on the first side in the predetermined direction with respect to the first connecting portion 23 and the second connecting portion 24 oppose the pair of contact faces 341, 341 with a predetermined third gap d3 in the width direction therebetween. A pair of projecting faces 26*a*, 26*a*, which are the faces on the outer sides in the width direction of the pair of projecting portions 26, 26 provided in the second portion 212, also oppose the pair of contact faces 341, 341 with a predetermined third gap d3 in the width direction therebetween.

The third gap d3 is narrower than the maximum width by which the connector 20 tilts from the reference orientation to the first side or the second side in the width direction when the pair of second contact portions 34, 34 are not provided. For this reason, when the connector 20 tilts, the connector 20 comes into contact with the second contact portion 34 during tilting. More specifically, at least one of the side faces 218*a*, 218*b* and the pair of projecting faces 26*a*, 26*a* comes into contact with the contact face 341 of the second contact portion 34 before the connector 20 swings over the maximum tilting width. As a result, the pair of second contact portions 34, 34 stop the tilting of the connector 20 while the connector 20 is tilting. As a result, it is possible to suppress the degree of elastic deformation of the lock portion 22 and the locked portion 32, and it is possible to suppress shortening of the durability lifespan of the connector fixing structure 11 due to tilting.

In this embodiment, by providing the pair of projecting portions 26, 26, it is possible to prevent twisting of the connector 20 that comes into contact with the second contact portion 34 during tilting. For example, if the connector 20 tilts toward the first side in the width direction when the pair of projecting portions 26, 26 are not provided, the side face 218*a* comes into contact with the contact face 341 and the tilting of the first portion 211 toward the first side in the width direction is stopped, but there is a risk that the tilting of the second portion 212 will not stop and the connector 20 will be twisted (the front side in the fitting direction will be tilted more to the first side in the width direction than the rear side). In this case, there is a risk that the lock portion 22 and the locked portion 32 will be elastically deformed so as to be twisted, and will be more easily damaged.

In the present embodiment, for example, when the connector 20 tilts to the first side in the width direction, the side face 218*a* and the projecting portion 26 come into contact with the contact face 341 at two locations, and therefore the connector 20 can be supported more stably, and twisting of the connector 20 can be prevented. Also, when the connector 20 tilts to the second side in the width direction, the side face 218*b* and the projecting portion 26 come into contact with the contact face 341 at two locations, thereby preventing twisting of the connector 20. As a result, it is possible to prevent the lock portion 22 and the locked portion 32 from elastically deforming in a twisting manner, and to suppress shortening of the durable lifespan of the connector fixing structure 11 due to tilting.

Note that the pair of second contact portions 34, 34 may also come into contact with the side faces 218*a*, 218*b* and the pair of projecting faces 26*a*, 26*a* in the reference orientation. That is, the pair of second contact portions 34, 34 may also come into contact with the connector 20 in the non-tilted state from the beginning, thereby almost completely preventing the connector 20 from swinging in the width direction. In this case, the distance in the width direction between the pair of contact faces 341, 341 is equal to the distance between the side faces 218*a*, 218*b* and the distance between the pair of projecting faces 26*a*, 26*a*.

However, if the pair of second contact portions 34, 34 are designed to come into contact with the connector 20 without gaps as described above, due to the influence of tolerances of the connector 20 and the holder 30 and the like, the distance in the width direction between the pair of second contact portions 34, 34 becomes smaller than the width of the connector 20 and the connector 20 cannot be fitted in the holder 30 in some cases. For this reason, in the present embodiment, the third gap d3 is provided as a clearance for allowing the connector 20 to fitted in the holder 30.

Also, if the second contact portion 34 comes into contact with the connector 20 in the non-tilted state from the beginning, the same problem occurs as when the connector 20 comes into contact with the first contact portion 33 from the beginning. That is, the connector 20 in the reference orientation is tilted in the width direction by the second contact portion 34, and there is a risk that the lock portion 22 and the locked portion 32 will always be elastically deformed. Also, there is a risk that a larger force will act on the lock portion 22 and the locked portion 32 with the contact portion between the connector 20 and the second contact portion 34 serving as a fulcrum.

Therefore, in the present embodiment, the third gap d3 is intentionally provided. As a result, it is possible to suppress the tilting of the connector 20, prevent an excessive force from acting on the lock portion 22 and the locked portion 32 when the connector 20 does not tilt, and prevent a larger force from acting on the lock portion 22 and the locked portion 32 due to an unintended location serving as a fulcrum. As a result, shortening of the durable lifespan of the connector fixing structure 11 can be suppressed more reliably.

As described above, the connector fixing structure 11 according to the present embodiment includes the connector 20 including the main body portion 21 and the lock portion 22 provided on the first face 214 (outer face of the present disclosure) of the main body portion 21, and the holder 30 including the locked portion 32 that fits with the lock portion 22 on the surface 31*a*. The main body portion 21 has the first portion 211 provided with the lock portion 22 and the second portion 212 provided extending frontward in the fitting direction from the first portion 211. The holder 30 has the first contact portion 33 that is provided protruding in the predetermined direction intersecting the fitting direction from the surface 31*a* and opposes the second portion 212 in the predetermined direction. The first contact portion 33 comes into contact with the second portion 212 when the second portion 212 tilts from the reference orientation with a component in the direction approaching the surface 31*a*, with the lock portion 22 serving as a fulcrum.

Modified Examples

Modified examples of the embodiment will be described below.

The connector 20 need not be provided with the first connecting portion 23, the second connecting portion 24, and the third connecting portion 25. For example, if there is no need to connect a plurality of connectors 20 in parallel, it is preferable to omit the first connecting portion 23, the second connecting portion 24, and the third connecting portion 25 because the configuration of the connector 20 is simplified.

The connector 20 may also have a shape that is shorter in the predetermined direction than the width direction, or may have a shape that has the same width in the width direction and the predetermined direction. In such a case as well, there is a problem in that the connector 20 tilts, and this problem can be solved by fixing the connector 20 with the holder 30 of the present embodiment.

The pair of projecting portions 26, 26 need not be provided on the connector 20. For example, if the contact between the side faces 218*a* and 218*b* and the pair of contact faces 341 and 341 can suitably suppress the tilting of the connector 20 in the direction of the arrow AR3, the pair of projecting portions 26, 26 may be omitted.

The pair of second contact portions 34, 34 need not be provided on the holder 30. As shown in FIG. 11, the first contact portion 33 opposes the portion of the second portion 212 excluding the projecting portion 26 over the width direction, and therefore tilting of connector 20 can be suppressed due to the contact face 331 coming into contact with the second face 215 of the connector 20 when the connector 20 tilts in the direction of the arrow AR3. In this manner, tilting of the connector 20 in both directions of the arrows AR2, AR3 may be suppressed by only the first contact portion 33.

Supplement

It should be noted that at least some of the embodiments and various modified examples described above may be combined with each other as appropriate. Also, the embodiments disclosed herein are to be considered as exemplary and non-limiting in all respects. The scope of the present disclosure is indicated by the claims, and is intended to include all changes within the meaning and range of equivalents to the claims.

The invention claimed is:

1. A connector fixing structure comprising:
- a connector having a main body portion and a lock portion provided on an outer face of the main body portion; and
- a holder having, on its surface, a locked portion that fits with the lock portion,
- wherein the main body portion of the connector includes:
  - a first portion provided with the lock portion, and
  - a second portion provided extending frontward in a fitting direction from the first portion, so as to be laterally offset from the first portion,
- the holder has a first contact portion laterally offset from the locked portion that is provided protruding from the surface in a predetermined direction intersecting the fitting direction and opposes the second portion in the predetermined direction, and
- the first contact portion comes into contact with the second portion when the second portion tilts from a reference orientation, as a result of being laterally offset from the first portion and with a component in a direction approaching the surface, with the lock portion serving as a fulcrum.

2. The connector fixing structure according to claim 1, wherein the first contact portion is not in contact with the second portion in the reference orientation.

3. The connector fixing structure according to claim 2, wherein the first contact portion has an inclined face that is inclined such that a height from the surface increases toward a front side in the fitting direction.

4. The connector fixing structure according to claim 1, wherein the holder further has a pair of second contact portions provided protruding in the predetermined direction from the surface, and
- the pair of second contact portions oppose both side faces of the connector in a width direction intersecting both the fitting direction and the predetermined direction, and come into contact with the connector tilting in the width direction with the lock portion serving as a fulcrum.

5. An electrical connection box comprising:
- a case including the connector fixing structure according to claim 1;
- a relay attached to the case; and
- wiring having a first end connected to the relay and a second end connected to the connector.

6. The connector fixing structure according to claim 2, wherein the holder further has a pair of second contact portions provided protruding in the predetermined direction from the surface, and
- the pair of second contact portions oppose both side faces of the connector in a width direction intersecting both the fitting direction and the predetermined direction, and come into contact with the connector tilting in the width direction with the lock portion serving as a fulcrum.

7. The connector fixing structure according to claim 3, wherein the holder further has a pair of second contact portions provided protruding in the predetermined direction from the surface, and
- the pair of second contact portions oppose both side faces of the connector in a width direction intersecting both the fitting direction and the predetermined direction, and come into contact with the connector tilting in the width direction with the lock portion serving as a fulcrum.

8. The electrical connection box according to claim 5, wherein the first contact portion is not in contact with the second portion in the reference orientation.

9. The electrical connection box according to claim 8, wherein the first contact portion has an inclined face that is inclined such that a height from the surface increases toward a front side in the fitting direction.

10. The electrical connection box according to claim 5, wherein the holder further has a pair of second contact portions provided protruding in the predetermined direction from the surface, and
- the pair of second contact portions oppose both side faces of the connector in a width direction intersecting both the fitting direction and the predetermined direction, and come into contact with the connector tilting in the width direction with the lock portion serving as a fulcrum.

11. The electrical connection box according to claim 8, wherein the holder further has a pair of second contact portions provided protruding in the predetermined direction from the surface, and
- the pair of second contact portions oppose both side faces of the connector in a width direction intersecting both the fitting direction and the predetermined direction, and come into contact with the connector tilting in the width direction with the lock portion serving as a fulcrum.

12. The electrical connection box according to claim 9, wherein the holder further has a pair of second contact portions provided protruding in the predetermined direction from the surface, and the pair of second contact portions oppose both side faces of the connector in a width direction intersecting both the fitting direction and the predetermined direction, and come into contact with the connector tilting in the width direction with the lock portion serving as a fulcrum.

* * * * *